(12) United States Patent
Lee et al.

(10) Patent No.: US 8,390,777 B2
(45) Date of Patent: Mar. 5, 2013

(54) METHOD FOR RECOVERING PROPERTIES OF DEGRADED LIQUID CRYSTAL

(75) Inventors: Wei Lee, Tao-Yuan (TW); I-Sheng Lin, Nantou (TW)

(73) Assignee: Chung Yuan Christian University, Tao-Yuan (TW)

( * ) Notice: Subject to any disclaimer, the term of this patent is extended or adjusted under 35 U.S.C. 154(b) by 582 days.

(21) Appl. No.: 12/558,482

(22) Filed: Sep. 11, 2009

(65) Prior Publication Data

US 2011/0065349 A1    Mar. 17, 2011

(51) Int. Cl.
*G02F 1/13* (2006.01)
(52) U.S. Cl. .................. 349/192; 349/187
(58) Field of Classification Search ............ 349/187, 349/192
See application file for complete search history.

(56) References Cited

U.S. PATENT DOCUMENTS

| | | | |
|---|---|---|---|
| 4,886,619 A * | 12/1989 | Janulis ................. | 252/299.1 |
| 2007/0008474 A1 * | 1/2007 | Hashimoto ............. | 349/130 |
| 2008/0153039 A1 | 6/2008 | Akimoto | |
| 2008/0246912 A1 * | 10/2008 | Inoue et al. ............. | 349/182 |
| 2009/0040433 A1 * | 2/2009 | Aiki et al. .............. | 349/75 |
| 2009/0148365 A1 * | 6/2009 | Roche et al. ........... | 423/164 |

FOREIGN PATENT DOCUMENTS

| | | |
|---|---|---|
| CN | 1896817 A | 1/2007 |
| JP | 57204512 A | 12/1982 |
| JP | 61167921 A | 7/1986 |
| JP | 62210419 A | 9/1987 |
| JP | 63261224 A | 10/1988 |
| JP | 07072439 A | 3/1995 |
| JP | 2000019533 A | 1/2000 |
| JP | 2006133251 A | 5/2006 |

* cited by examiner

*Primary Examiner* — Nathanael R Briggs

(74) *Attorney, Agent, or Firm* — Stout, Uxa, Buyan & Mullins, LLP

(57) ABSTRACT

The primary cause of degradation of a liquid crystal is the presence of trapped water within the liquid crystal, and the properties of a degraded liquid crystal can be recovered by removing the water from the degraded liquid crystal. A method for recovering the properties of a liquid crystal is disclosed to include a step of removing the trapped water.

12 Claims, 3 Drawing Sheets

METHOD FOR RECOVERING PROPERTIES OF DEGRADED LIQUID CRYSTAL

BACKGROUND OF THE INVENTION

1. Field of the Invention

The present invention relates to liquid crystals, and more particularly, to a method for recovering the electrical properties of a degraded liquid crystal.

2. Description of the Prior Art

Because of the problems such as the reduction of voltage holding ratio, increase in threshold voltage, image sticking, gray-level shift, image flickering, and the slowdown of response, the field-screening effect originating from impurity ions within a liquid-crystal (LC) cell has long been a critical issue in the liquid-crystal display (LCD) technology.

For example, Perlmutter et al. studied the performance degradation of LC cells by analyzing the time evolution of optical and integrated current vs. voltage hysteresis curves when the test cells were subjected to a direct current (DC) bias. They found that the performance of the LC cells is degraded due to permanent increases in mobile ion populations in the LC bulks, and suggested that this permanent increase is due to selective adsorption by the alignment layers of ions of a single charge sign combined with the presence of a neutral ionizable species in the liquid crystal. [S. H. Perlmutter, D. Doroski, and G. Modder, "Degradation of liquid crystal device performance due to selective adsorption of ions," Applied Physics Letters 69(9), 1182-1184 (1996).] For example, Palomares et al. investigated the influence of ions dissolved in liquid crystals by checking the optical response of a nematic liquid crystal submitted to a periodic square wave. They showed that various densities of ions and various properties of the dielectric layer deposited on the electrodes result in different regimes having different optical phase. In addition, they investigate the role of the mobility of the ions in the phenomenon and supposed that the diffusion current is negligible with respect to the drift current. [L. O. Palomares, J. A. Reyes, and G. Barbero, "Influence of ions on the dynamical response of a nematic cell submitted to a periodic external field: Role of the ionic impurities," Physics Letters A 333, 157-163 (2004).] Tsevetkov et al. observed a carrier charge transfer and its influence on electro-optical response for nematic liquid crystal with positive dielectric anisotropy ($\Delta\epsilon$>0) in which ions with known parameters ($Cu^+$) were injected. The experimental results showed that the presence of the ions may increase the electro-optical response due to hydrodynamic component, and the developed technique could be applied to measure the mobility of the ions. [V. A. Tsevetkov and O. V. Tevetkov, "Ions influence on electrooptical characteristics of NLC," Molecular Crystals and Liquid Crystals 368, 625-632 (2001).] Colpaert et al. proposed an appropriate measuring technique to determine the ion source and characterize the ions in the liquid crystal. They suggested that the ion contamination in twisted nematic liquid crystals should be limited to assure good electro-optical performance of AM-LCDs. [C. Colpaert, B. Maximus, and A. de Meyere, "Adequate measuring techniques for ions in liquid crystal layers," Liquid Crystals 21(1), 133-142 (1996).]

To solve the problems caused by the ions, current strategy is to employ high-resistivity LC materials with a low concentration of impurity ions and to address the displays in alternating current (AC) to avoid surface polarization, which would otherwise lead to the field screening and, in turn, degrade the electro-optical performance of the devices. Recently, observations on voltage-dependent transmittance, voltage-dependent capacitance, dynamical optical response, and behavior of transient current in a polarity-reversed field have invariably shown that the inclusion of an adequate amount of carbon nanotubes dramatically reduces the abominable mobile ions in cells consisting of a low-resistivity LC mixture [W. Lee, C.-Y. Wang, and Y.-C. Shih, "Effects of carbon nanosolids on the electro-optical properties of a twisted nematic liquid-crystal host," Applied Physics Letters 85(4), 513-515 (2004); H.-Y. Chen and W. Lee, "Electro-optical characteristics of a twisted nematic liquid-crystal cell doped with carbon nanotubes in a dc electric field," Optical Review 12(3), 223-225 (2005); W. Lee, J.-S. Gau, and H.-Y. Chen, "Electro-optical properties of planar nematic cells impregnated with carbon nanosolids," Applied Physics B: Lasers and Optics 81(2/3), 171-175 (2005); W. Lee and Y.-C. Shih, "Effects of carbon nanotube doping on the performance of a TN-LCD," Journal of the Society for Information Display 13(9), 743-747 (2005); H.-Y. Chen and W. Lee, "Suppression of field screening in nematic liquid crystals by carbon nanotubes," Applied Physics Letters 88(22), 222105-1-3 (2006); H.-Y. Chen, W. Lee, and N. A. Clark, "Faster electro-optical response characteristics of a carbon-nanotube-nematic suspension," Applied Physics Letters 90(3), 033510-1-3 (2007); W. Lee and H.-Y. Chen, "Observation of transient current in a nanotube-doped liquid-crystal cell induced by a polarity-reversed field," Japanese Journal of Applied Physics 46(5A), 2962-2967 (2007); K.-X. Yang and W. Lee, "Temperature-dependent electric characteristics in an E7/CNT colloid," Molecular Crystals and Liquid Crystals 475(1), 201-208 (2007); W. Lee, H.-Y. Chen, and Y.-C. Shih, "Reduced dc offset and faster dynamic response in a carbon-nanotube-impregnated liquid-crystal display," Journal of the Society for Information Display 16(7), 733-741 (2008); M. Rahman and W. Lee, "Scientific duo of carbon nanotubes and nematic liquid crystals," Journal of Physics D: Applied Physics 42(6), 063001-1-12 (2009).]

In the relevant art, manufacturers and researchers have made many efforts to eliminate the influence of ions in liquid crystals. For example, one solution has been to request that the manufacturers produce liquid crystals of higher purity and higher reliability; other solutions have been to develop new LC materials or new synthesis methods, or to select more appropriate liquid crystals for given devices, such as thin film transistor liquid crystal displays (TFT-LCDs). Unfortunately, although the process capability has been strictly requested and new liquid crystals and new synthesis methods have been developed, unwanted ions are still somehow dissolved in the liquid crystals and, in turn, affect the performance of the resulting display devices.

On the other hand, it is well-known that liquid crystals stored in bottles or vials gradually lose their electro-optical integrity with time, trapping more and more ion impurity in the materials. Although doping carbon nanotubes or nanoclay can dramatically reduce the mobile ions in LC cells, the properties of the liquid crystal are altered by the dopants and thus may hinder the electrical design of the display devices. Moreover, the colloidal stability of the LC cells doped with nanotubes may be damaged after a long-term operation. Besides, altering of the driving waveform of the liquid crystals gradually (e.g. over time) cannot satisfy the more rigorous specifications, including more rigorous image sticking, flicker, and the like. In another aspect, recent liquid crystals with higher purity and superior properties have been made by newer synthesis methods. Although the liquid crystals are superior in purity, lightfastness, thermostability, reliability, and resistivity, the storing environment or the manufacturing environment inevitably contaminates the liquid crystals during the processes, thus degrading the properties of the liquid crystals.

In sum, known prior-art approaches have failed to identify the source of the abominable mobile ions and/or to provide an efficient way to treat the decayed liquid crystals. The conventional and only practical treatment for deteriorated liquid crystals is to discard them, resulting in large unwanted cost to manufacturers for the liquid crystals and display devices. Accordingly, there is still a need to identify the primary cause of unwanted mobile ions in, and thus to provide a more cost-effective treatment of, and even better to recover the properties of, such decayed liquid crystals.

SUMMARY OF THE INVENTION

One object of the present invention is to identify the primary cause of unwanted mobile ions and with that to provide a method for recovering the properties of a decayed liquid crystal.

According to one embodiment, a step of removing trapped water from a decayed liquid crystal is disclosed. The removing-trapped-water step is performed before (e.g. immediately before) the liquid crystal is employed to construct a liquid crystal (LC) cell.

The water-removal step may comprise three ways: the first way is providing heat to vaporize the trapped water from the liquid crystal by heat conduction, convection, and/or radiation. The second way is vacuum drying. Under some conditions, both the first way and the second way can be combined.

The third way is exposing the liquid crystal to at least one drying or dehydrating agent (such as mixing them together) for a period of time and then removing the dehydrating agent from the liquid crystal. The drying agent may fall in one of four main categories: first, inorganic absorbents such as silica gels and aerogels, zeolites, aluminophosphates, titanosilicates, clays and other metal oxides; second, carbon-based adsorbents such as activated carbon, graphite, carbon molecular sieves, preshaped carbon fibers and nanotubes; third, organic polymers such as water-absorbent resins; fourth, coordination polymers such as $Mg_2(BTEC)$, where BTEC stands for 1,2,4,5-bezenetetracarboxylate anion. In this case, the preferred dehydrating agent must not introduce ion impurity into the liquid crystal.

According to another embodiment, a method is disclosed for recovering the electrical resistivity of a degraded liquid crystal, comprising the following: providing at least one dehydrating agent, pre-drying the dehydrating agent, and exposing the liquid crystal to the dehydrating agent for a period of time, so as to remove the trapped water from the liquid crystal, thereby recovering the electrical resistivity of the liquid crystal.

DETAILED DESCRIPTION OF THE PREFERRED EMBODIMENT

Figure 1:
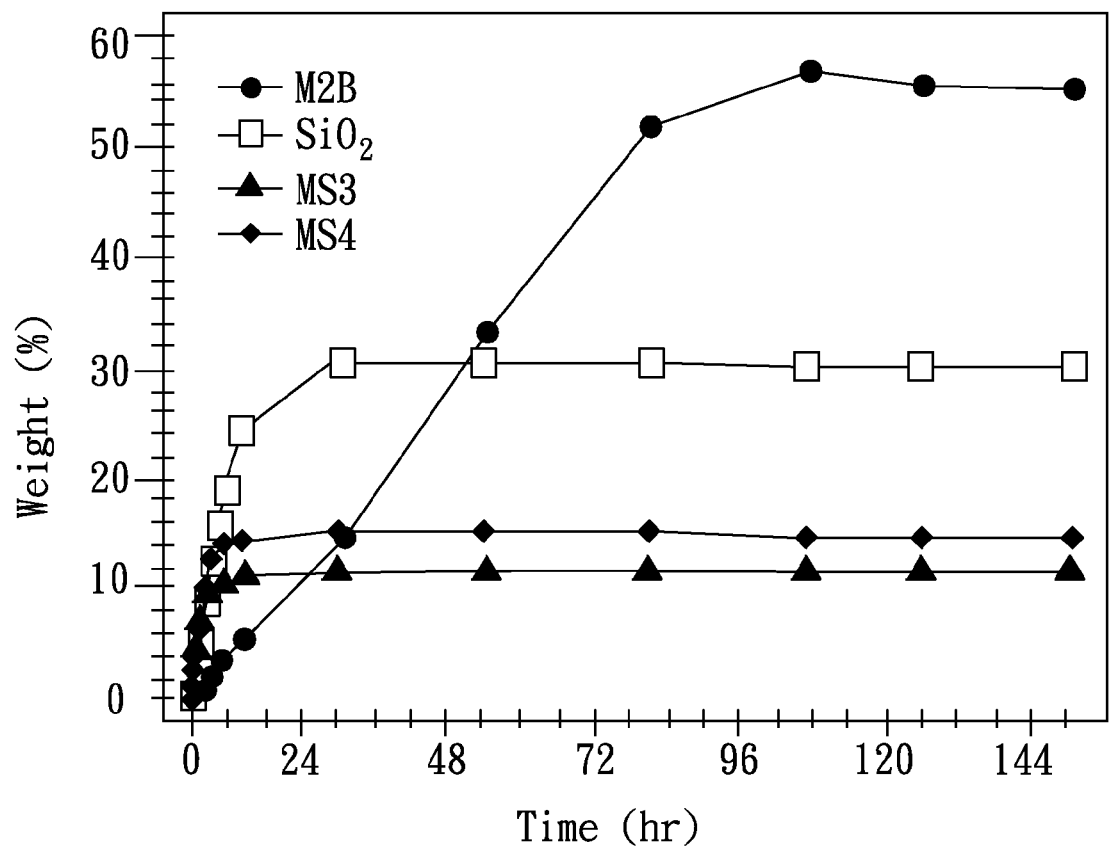
FIG. 1 shows a comparison of water-sorption kinetics for four dehydrating agents according to embodiments of the present invention.

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known components and process operations are not described in detail in order not to unnecessarily obscure the present invention. While drawings are illustrated in detail, it is appreciated that the quantity of the disclosed components may be greater or less than that disclosed, except where expressly restricting the amount of the components.

As discussed above, prior art has not been clear as to what is the primary source of the ions. Researchers and manufacturers have been devoted to lowering the ion impurities by improving the process capability and developing new LC materials. In this aspect, the present invention proposes a different viewpoint. Experiments have been made by the present invention and the experimental results show that the degradation of the properties of liquid crystals primarily stems from the trapping of atmospheric water into the liquid crystals. Water molecules embedded in a LC material can form hydrogen cations and hydroxyl anions, generating considerable amount of impurity ions to enhance the field-screening effect. In particular, the embedded water molecule reduces the resistivity of the liquid crystals, and thus degrades the electro-optical properties. One of the experimental results shows that after storing a liquid crystal in a common environment for several days, the resistivity of the liquid crystal is decreased from $10^{15}$ Ω·cm to $10^{13}$ Ω·cm, consequently resulting in significant change of other properties.

Since the primary cause—water—has been spotted, the present invention provides a method for recovering the properties of a degraded liquid crystal. The liquid crystal is selected from the calamitic group consisting of nematic liquid crystal, smectic liquid crystal, cholesteric liquid crystal, and (anti-)ferroelectric liquid crystal. The method comprises steps of removing trapped water from the degraded liquid crystal, and the water-removal steps may employ any well-known, existent, on-developing, or to-appear drying technology. There is only one limitation for the mentioned removing step—not to introduce additional ion impurity into the liquid crystal.

The removing-trapped-water step may comprise, for instance, three ways or implementations. The first way is or can comprise providing energy (e.g. heat) via thermal conduction, convection, and/or radiation to vaporize the trapped water from the degraded liquid crystal. The second way is or can comprise low pressure, low heat and/or vacuum drying. Under some conditions, both the first way and the second way can be wholly or partially integrated or performed together. One embodiment of the present invention provides a heated gas (such as dry air) to convectively and directly dry the liquid crystal, and/or the process may be performed in a vacuum chamber to speed up the diffusion rate of water. Another embodiment of the present invention comprises the steps of indirect heating of the liquid crystal through a medium, such as a hot plate, and similarly, the process may be carried out in a vacuum chamber to speed up the drying rate. It is noted that, when the degraded liquid crystal is heated to a predetermined temperature, the temperature should be controlled to be less than an upper limit that may damage the liquid crystal.

Additionally, the third way is or can comprise utilizing a drying or dehydrating agent to remove trapped water from the degraded liquid crystal. The dehydrating agent may comprise an agent selected from one or more of inorganic absorbents, carbon-based adsorbents, organic polymers, and coordination polymers. For instance, the dehydrating agent may comprise one or more of silica gels and aerogels, metal oxides, carbons in various forms, molecular sieves based on zeolites, aluminophosphates, titanosilicates and so on, mesoporous materials such as those synthesized by using long-chain surfactant molecules, clays such as montmorillonite and bentonite, organic polymers such as water-absorbent resins, coordination polymers such as $Mg_2(BTEC)$, and the like.

Water-absorbent resins have been used extensively as a component of sanitary articles, such as paper diapers, sanitary napkins, and incontinence pads, to absorb body fluids. The water-absorbent resins are also used for other kinds of products, such as agricultural/gardening tools, in the context of, for example, a water retention agent, ameliorant, etc.

The water-absorbent resin is mainly made of (i) cross-linked partially neutralized polyacrylic acid; (ii) a hydrolyzed starch-acrylic acid graft polymer; (iii) a saponified vinyl acetate-acrylic acid ester copolymer; (iv) hydrolyzed acrylonitrile copolymer or cross-linked acrylonitrile copolymer; (v) hydrolyzed acrylamide copolymer or cross-linked acrylamide copolymer; (vi) a cross-linked cationic monomer, and the like.

In some embodiments of the present invention, the method comprises steps of removing water from the degraded liquid crystal by exposing the degraded liquid crystal to at least one dehydrating agent. For example, the degraded liquid crystal may mix with the dehydrating agent for a period of time, and then the dehydrating agent is removed from the liquid crystal. In another embodiment of the present invention, the dehydrating agent may be pre-dried before exposing the liquid crystal to the dehydrating agent.

The requirement for the geometric form of the dehydrating agent is to allow easy operation. Taking a negative example; powder form is not preferred for its inconvenience to separate from the liquid crystal. The preferred geometric form of the dehydrating agent comprises one selected from the group consisting essentially of bead, rod, pellet, toroid, and combinations thereof. In some cases, the dehydrating agent is immobilized on a carrier or in a fixed-bed module to solve the problem.

Furthermore, the used dehydrating agent may be regenerated by common drying technology for solids, such as thermal vaporization, vacuuming, or any combination thereof. In other words, the dehydrating agent can be reused according to the present invention, providing an eco-friendly and economic procedure to restore the degraded liquid crystal.

EXAMPLE

In this example, four adsorbents—a silica gel, two kinds of zeolite-based molecular sieves, and a novel water absorbent $Mg_2(BTEC)$—are employed for drying the degraded liquid crystal. FIG. 1 shows the comparison of water-sorption kinetics for the four dehydrating agents in which $SiO_2$ denotes the microporous silica gel, MS3 denotes a zeolite-based molecular sieve with pore size of 3 Å, MS4 denotes another zeolite-based molecular sieve with pore size of 4 Å, and M2B denotes the novel water absorbent, "$[Mg_2(BTEC)]$." The above dehydrating agents may be purchased from the respective providers or synthesized in the laboratory. In this example, M2B is synthesized in the Solid-State Chemistry Laboratory at Chung Yuan Christian University, Taiwan.

The experiments start with a pretreatment process, where four adsorbents described above were heated to 150° C. for five hours prior to the comparative sorption kinetics experiment. After that, 5 g of each dehydrated absorbent was contained in a beaker that was left open to air at 25° C. The atmospheric pressure was not specifically regulated and the relative humidity was about 50-60% throughout the experiment. Each dehydrating agent absorbed the moisture of the air thus resulting in an increase of its weight. FIG. 1 shows the curves of the increased weight percentage versus time. It is clear that M2B absorbed the most water loadings and outperformed the other desiccating agents after 144 hours.

The effects of these water sorbents to restore the degraded liquid crystal are characterized by voltage (V)-capacitance (C) as well as time-evolved impedance measurements.

Figure 2:
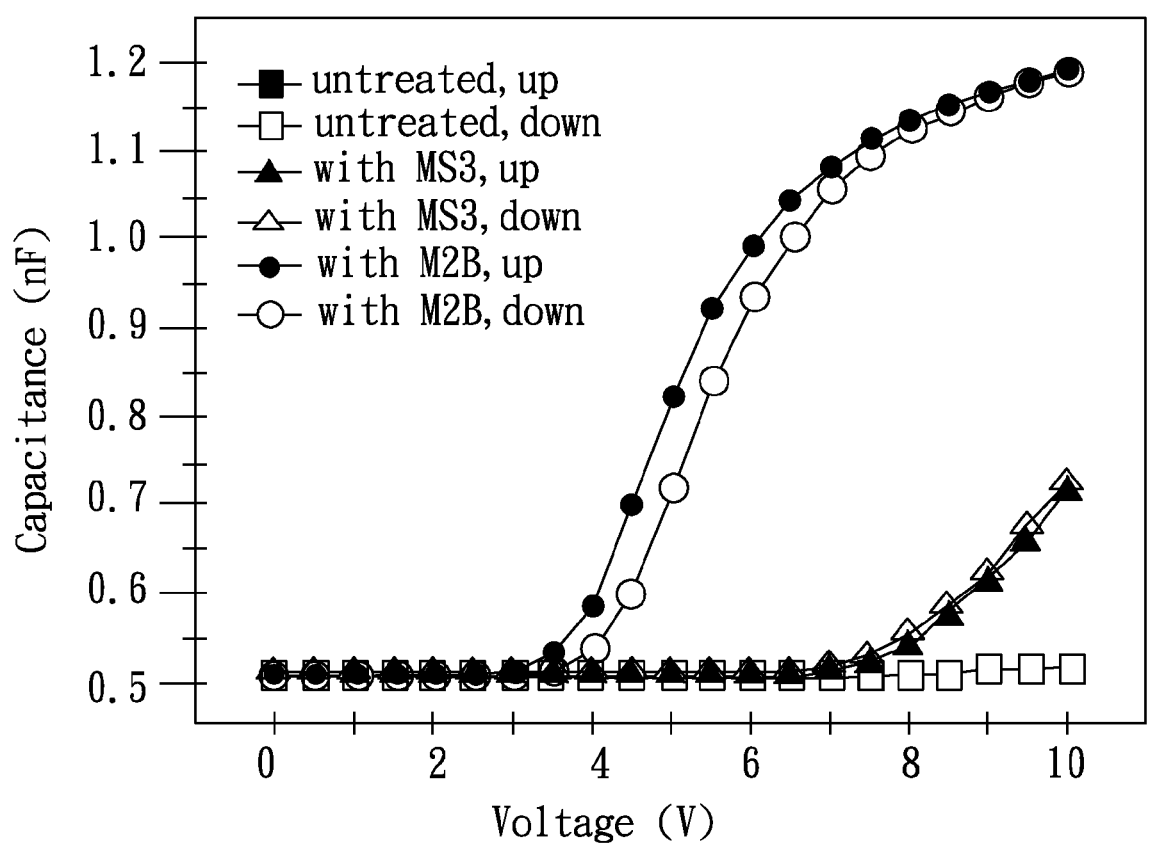
FIG. 2 shows the voltage-capacitance curves of three distinct LC cells separately constructed by two recovered liquid crystals and a comparative degraded liquid crystal according to embodiments of the present invention.

FIG. 2 shows the V-C curves of three distinct LC cells separately constructed by two recovered liquid crystals and a comparative degraded liquid crystal. In this example, an old batch and a new batch of nematic liquid crystals (model name: 5CB) were respectively received from Merck Company in March 2005 and February 2009 and are respectively designated as oLC and nLC. The old batch 5CB is stored in a bottle package, which was first unsealed in September 2005. The bottle has been resealed and saved in a dry cabinet controlled at 35% humidity ever since. Both MS3 and M2B were preheated in a vacuum oven at 200° C. for five hours and then naturally cooled down to room temperature. After that, 25 g of oLC were respectively contained in two beakers and then respectively mixed with 10 wt % of MS3 and M2B. After 96 hours, the dehydrating agents absorbed most of the moisture, and then MS3 and M2B were removed from the two samples, such that two restored oLC samples were obtained. Two LC cells were then formed by the two restored oLC samples, respectively, and another LC cell was formed by the degraded oLC, i.e., untreated oLC. As is well-known in the art, a LC cell is a liquid crystal sandwiched between two substrates, and an electric field can be exerted on the liquid crystal via the two electrically conducting substrates. In FIG. 2, curve "untreated, up" denotes the charging curve of the LC cell constructed by the untreated oLC, curve "untreated, down" denotes the discharging curve of the LC cell constructed by the untreated oLC, and so on. In addition, the probe voltage exerted to the liquid crystal cells had a 50-mV amplitude in sinusoidal waveform at 1 kHz and the data were acquired at 30° C. and RH 70%.

One can see from FIG. 2 that M2B substantially rectifies the voltage-dependent capacitive behavior from the degraded liquid crystal. The liquid crystal restored by M2B shows excellent response sensitivity, only 3 V of voltage being needed for driving the liquid crystal. In contrast, 7 V of voltage is needed for driving the liquid crystal treated by MS3 and the untreated liquid crystal cannot be driven even though the exerted voltage is as high as 10 V; this is because the ion charge originating from the moisture builds a reverse electric field opposite to the applied electric field across the LC cell.

Figure 3:
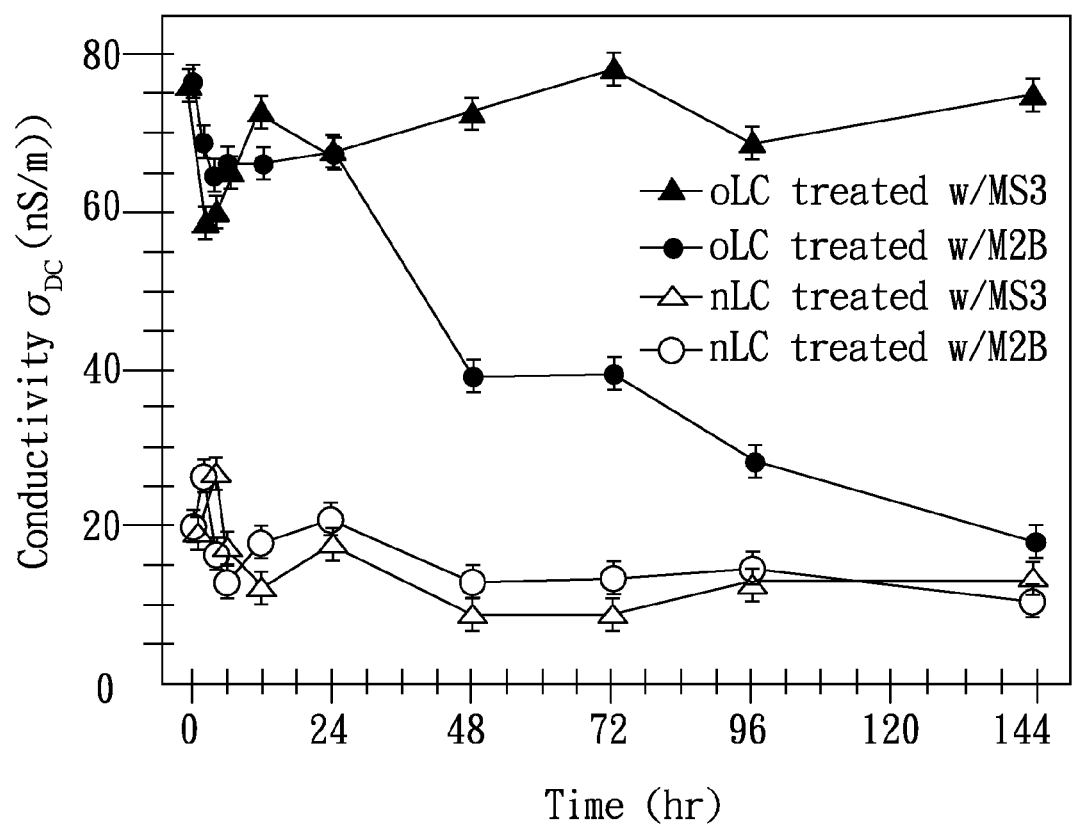
FIG. 3 shows the conductivities of test cells containing new and old LC substances separately treated by two kinds of dehydrating agents of the present invention.

Deduced from the dielectric spectra between 20 Hz and 100 kHz, the conductivities in various LC cells are illustrated in FIG. 3, where the curve "oLC treated w/MS3" denotes the conductivity versus drying time curve of the oLC treated with MS3, the curve "nLC treated w/M2B" denotes the conductivity versus drying time curve of the nLC treated with M2B, and so on. This figure shows that oLC with apparent ion contamination gains back its higher resistivity after desiccative treatment by the regenerative dehydrating agent M2B. After treating with M2B for 144 hours, the conductivity of oLC has almost recovered to its original conductivity, i.e., the conductivity of nLC. The conductivity data deduced from dielectric spectroscopy clearly demonstrate that M2B is effective in recovering the electrical resistivity of an old batch of liquid crystal. The conductivity of oLC treated with MS3 also can be recovered, although much time (not shown in FIG. 3) is needed for the recovery.

The above example proves that water is the primary cause to degrade a liquid crystal, and the properties of a degraded liquid crystal can be restored by removing the water from the degraded liquid crystal. The electrical resistivity of the recovered liquid crystal is improved up to or more than 80% of that of new liquid crystal, preferred 90%. According to some embodiments of the present invention, the method for recovering the properties of the degraded liquid crystal is performed before the LC cell is formed. In one embodiment of the present invention, once the water is removed from the liquid crystal, the liquid crystal is immediately employed to construct a LC cell.

Moreover, in an embodiment of the present invention, the more number of coordination water in the resulting species derived from a dehydrating agent, the more amount of the trapped water can be removed. For example, transformed from dry $Mg_2(BTEC)$, $Mg_2(BTEC)(H_2O)_{10} \cdot H_2O$ containing 10 coordination water molecules implies the exceptional ability of absorbing water according to the foregoing example.

The present invention further provides methods for preserving the restored liquid crystal, if it is not employed to immediately form LC cells. The preserving methods comprise storing the recovered liquid crystal in a gastight container. In another embodiment of the present invention, the method further comprises a step of filling the gastight container with dry air, nitrogen or an inert gas. In another embodiment of the present invention, the method further comprises a step of vacuuming the gastight container.

Although specific embodiments have been illustrated and described, it will be appreciated by those skilled in the art that various modifications may be made without departing from the scope of the present invention, which is intended to be limited solely by the appended claims.

What is claimed is:

1. A method for recovering an electrical resistivity of a liquid crystal that degrades due to improper storage or long-term use, comprising:
   providing at least one coordination polymer;
   pre-drying the coordination polymer;
   exposing the liquid crystal to the coordination polymer for a period of time, so as to remove trapped water from the liquid crystal in a physical manner, thereby recovering the electrical resistivity of the liquid crystal; and
   separating the at least one coordination polymer from the liquid crystal.

2. The method as recited in claim 1, wherein the removing-trapped-water step is performed before the liquid crystal is employed to construct a liquid crystal cell.

3. The method as recited in claim 1, after removing the trapped water, the electrical resistivity of the recovered liquid crystal is improved to or more than 80% of that of new liquid crystal.

4. The method as recited in claim 1, wherein the coordination polymer is about 10 wt % of the liquid crystal.

5. The method as recited in claim 1, wherein the coordination polymer is $Mg_2(BTEC)$, and BTEC stands for 1,2,4,5-bezenetetracarboxylate anion.

6. The method as recited in claim 1, wherein the coordination polymer does not introduce ion impurity into the liquid crystal.

7. The method as recited in claim 1, wherein the geometric form of the coordination polymer comprises one of the group consisting of bead, rod, pellet, and toroid.

8. The method as recited in claim 1, wherein the coordination polymer is immobilized on a carrier or in a fixed-bed module.

9. The method as recited in claim 1, wherein the liquid crystal is selected from the group consisting of nematic liquid crystal, smectic liquid crystal, cholesteric liquid crystal, and (anti-)ferroelectric liquid crystal.

10. The method as recited in claim 1, further comprising storing the liquid crystal in a gastight container, after the trapped water is removed from the liquid crystal.

11. The method as recited in claim 10, further comprising filling the gastight container with dry air, nitrogen or an inert gas.

12. The method as recited in claim 10, further comprising vacuuming the gastight container.

* * * * *